United States Patent
Hayashi et al.

(10) Patent No.: US 10,547,389 B2
(45) Date of Patent: Jan. 28, 2020

(54) OPTICAL MODULATION UNIT, AND METHOD FOR CONTROLLING OPTICAL MODULATION UNIT

(71) Applicant: Mitsubishi Electric Corporation, Chiyoda-ku (JP)

(72) Inventors: Shusaku Hayashi, Tokyo (JP); Kentaro Enoki, Tokyo (JP); Koichi Akiyama, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/321,846

(22) PCT Filed: May 18, 2017

(86) PCT No.: PCT/JP2017/018649
§ 371 (c)(1),
(2) Date: Jan. 30, 2019

(87) PCT Pub. No.: WO2018/061296
PCT Pub. Date: Apr. 5, 2018

(65) Prior Publication Data
US 2019/0165862 A1    May 30, 2019

(30) Foreign Application Priority Data
Sep. 30, 2016  (JP) ................................ 2016-192792

(51) Int. Cl.
*H04B 10/516* (2013.01)
*H04B 10/556* (2013.01)
(Continued)

(52) U.S. Cl.
CPC ..... *H04B 10/5161* (2013.01); *H04B 10/5053* (2013.01); *H04B 10/5057* (2013.01);
(Continued)

(58) Field of Classification Search
None
See application file for complete search history.

(56) References Cited

U.S. PATENT DOCUMENTS

| 2007/0065161 A1* | 3/2007 | Miura ................... G02F 1/0123 398/186 |
| 2008/0112710 A1* | 5/2008 | Tanaka .................. G02F 1/0123 398/188 |

(Continued)

FOREIGN PATENT DOCUMENTS

| JP | 2011-44906 A | 3/2011 |
| JP | 2015-52670 A | 3/2015 |

OTHER PUBLICATIONS

International Search Report dated Aug. 8, 2017 in PCT/JP2017/018649 filed on May 18, 2017.

*Primary Examiner* — David W Lambert
(74) *Attorney, Agent, or Firm* — Oblon, McClelland, Maier & Neustadt, L.L.P.

(57) ABSTRACT

A timing adjuster shifts a timing between a first data-stream group and a second data-stream group in accordance with a timing setting. A data generator in first test mode generates a first test-data stream repeating 2N-bit marks and 2N-bit spaces as each of a first data stream and a third data stream, and generates a second test-data stream that is N-bit shifted from the first test-data stream, where N denotes a natural number. A first phase-difference setting and a second phase-difference setting are rendered zero. The timing adjuster adjusts the timing setting so as to maximize a detected value from a peak detection circuit.

6 Claims, 5 Drawing Sheets

(51) Int. Cl.
*H04J 14/06* (2006.01)
*H04B 10/50* (2013.01)
*G02F 1/025* (2006.01)
*G02F 1/015* (2006.01)

(52) U.S. Cl.
CPC .......... *H04B 10/5561* (2013.01); *H04J 14/06* (2013.01); *G02F 1/015* (2013.01); *G02F 1/025* (2013.01)

(56) References Cited

U.S. PATENT DOCUMENTS

| | | | |
|---|---|---|---|
| 2010/0021182 A1* | 1/2010 | Asano | H04B 10/5057 398/188 |
| 2011/0044702 A1 | 2/2011 | Mizuguchi et al. | |
| 2012/0314277 A1* | 12/2012 | Matsuda | G02F 1/0123 359/341.1 |
| 2015/0171971 A1* | 6/2015 | Enoki | H04B 10/50575 398/183 |

\* cited by examiner

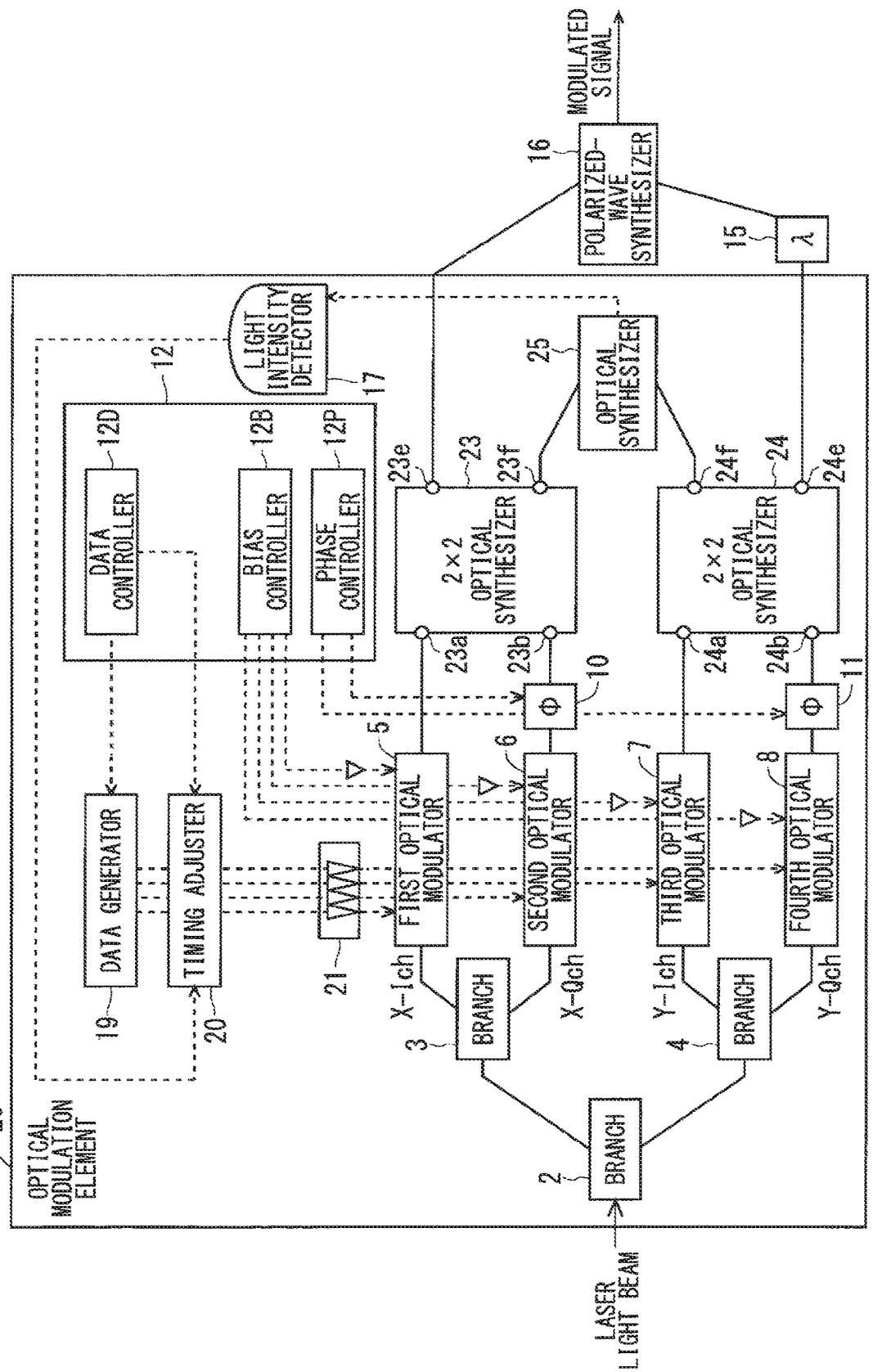
F I G. 9

OPTICAL MODULATION UNIT, AND METHOD FOR CONTROLLING OPTICAL MODULATION UNIT

TECHNICAL FIELD

The present invention relates to optical modulation unit and methods for controlling the optical modulation units, and particularly, to an optical modulation unit using polarization multiplexing and to a method for controlling such an optical modulation unit.

BACKGROUND ART

Examples of modulation in a Mach-Zehnder (MZ) optical modulator include dual-polarization quadrature phase-shift keying (DP-QPSK) and dual-polarization quadrature amplitude modulation (DP-16QAM). In these modulation schemes, light is modulated by a plurality of data streams through polarization multiplexing. A timing difference in data streams between polarized waves, which can be seen in the modulation, degrades signal properties. The timing difference hence needs to be reduced (c.f., Japanese Patent Application Laid-Open No. 2015-052670, i.e., Patent Document 1).

For instance, Japanese Patent Application Laid-Open No. 2011-044906 (i.e., Patent Document 2) describes a laser light beam branched into two light beams. The light beams are individually modulated, and then they are synthesized. The polarization of one of the light beams is maintained before the synthesis (X-polarized wave). The polarization of the other light beam is 90° rotated before the synthesis (Y-polarized wave). A timing difference between the polarized waves can be seen after the modulation. This is because different data streams have different distances from a data generator, which generates data streams used in modulation, to a modulator, or different distances in the inside of the modulator. The timing difference causes the degradation of the signal properties. To address such degradation, the intensity of a synthesized output consisting of the X-polarized wave and the Y-polarized wave is detected; then, the timing of each data stream is controlled using the intensity information. This reduces the timing difference in data between the polarized waves.

PRIOR ART DOCUMENTS

Patent Documents

Patent Document 1: Japanese Patent Application Laid-Open No. 2015-052670
Patent Document 2: Japanese Patent Application Laid-Open No. 2011-044906

SUMMARY

Problem to be Solved by the Invention

The technique in Japanese Patent Application Laid-Open No. 2011-44906 has difficulty in addressing a large timing difference equal to or more than one bit.

To solve this problem, it is an object of the present invention to provide an optical modulation unit that adjusts an arbitrary amount of timing difference, and to provide a method for controlling such an optical modulation unit.

Means to Solve the Problem

An optical modulation unit according to one aspect of the present invention includes a data generator, a timing adjuster, at least one branch, a first optical modulator, a second optical modulator, a first phase adjuster, a first optical synthesizer, a third optical modulator, a fourth optical modulator, a second phase adjuster, a second optical synthesizer, a polarized-wave synthesizer, a peak detection circuit, and a controller. The data generator generates a first data-stream group having first and second data streams, and a second data-stream group having third and fourth data streams. The timing adjuster shifts a timing between the first data-stream group and the second data-stream group in accordance with a timing setting. The at least one branch divides a received light beam into a first light beam, a second light beam, a third light beam, and a fourth light beam. The first optical modulator modulates the first light beam on the basis of the first data stream. The second optical modulator modulates the second light beam on the basis of the second data stream. The first phase adjuster shifts the phase difference between a light beam from the first optical modulator and a light beam from the second optical modulator. The first optical synthesizer synthesizes the light beam from the first optical modulator, and the light beam from the second optical modulator through the first phase adjuster. The third optical modulator modulates the third light beam on the basis of the third data stream. The fourth optical modulator modulates the fourth light beam on the basis of the fourth data stream. The second phase adjuster shifts the phase difference between a light beam from the third optical modulator and a light beam from the fourth optical modulator in accordance with a second phase-difference setting. The second optical synthesizer synthesizes the light beam from the third optical modulator, and the light beam from the fourth optical modulator through the second phase adjuster. The polarized-wave synthesizer synthesizes a light beam from the first optical synthesizer and a light beam from the second optical synthesizer that are two polarized waves orthogonal to each other. The peak detection circuit outputs a detected value by detecting the intensity peak of a light beam coming from the polarized-wave synthesizer. The controller has an adjustment mode for adjusting the timing setting in the timing adjuster. The data generator has a first test mode. The data generator in the first test mode generates a first test-data stream repeating 2N-bit marks and 2N-bit spaces as each of the first data stream and the third data stream, and generates a second test-data stream that is N-bit shifted from the first test-data stream as each of the second data stream and the fourth data stream, where N denotes a natural number. The timing adjuster has a setting mode for adjusting the timing setting so as to maximize the detected value from the peak detection circuit. The controller in the adjustment mode controls the first phase adjuster and the second phase adjuster in such a manner that the first phase-difference setting and the second phase-difference setting are zero, and at least temporarily places the data generator in the first test mode, and at least temporarily places the timing adjuster in the setting mode.

An optical modulation unit according to another aspect of the present invention includes a data generator, a timing adjuster, at least one branch, a first optical modulator, a second optical modulator, a first phase adjuster, a first optical synthesizer, a third optical modulator, a fourth optical modulator, a second phase adjuster, a second optical synthesizer, a polarized-wave synthesizer, a third optical synthesizer, a light intensity detector, and a controller. The data generator generates a first data-stream group having first and second data streams, and a second data-stream group having third and fourth data streams. The timing adjuster shifts a timing between the first data-stream group and the second data-stream group in accordance with a timing setting. The at least one branch divides a received light beam into a first light beam, a second light beam, a third light beam, and a fourth light beam. The first optical modulator modulates the first light beam on the basis of the first data stream. The second optical modulator modulates the second light beam on the basis of the second data stream. The first phase adjuster shifts the phase difference between a light beam from the first optical modulator and a light beam from the second optical modulator in accordance with a first phase-difference setting. The first optical synthesizer synthesizes the light beam from the first optical modulator, and the light beam from the second optical modulator through the first phase adjuster. The third optical modulator modulates the third light beam on the basis of the third data stream. The fourth optical modulator modulates the fourth light beam on the basis of the fourth data stream. The second phase adjuster shifts the phase difference between a light beam from the third optical modulator and a light beam from the fourth optical modulator in accordance with a second phase-difference setting. The second optical synthesizer synthesizes the light beam from the third optical modulator, and the light beam from the fourth optical modulator through the second phase adjuster. The polarized-wave synthesizer synthesizes a light beam from the first optical synthesizer and a light beam from the second optical synthesizer that are two polarized waves orthogonal to each other. The third optical synthesizer synthesizes the light beam from the first optical synthesizer and the light beam from the second optical synthesizer that are two polarized waves having a common polarized-wave direction. The light intensity detector outputs a detected value by detecting the intensity of a light beam coming from the third optical synthesizer. The controller has an adjustment mode for adjusting the timing setting in the timing adjuster. The data generator has a first test mode. The data generator in the first test mode generates a first test-data stream repeating 2N-bit marks and 2N-bit spaces as each of the first data stream and the third data stream, and generates a second test-data stream that is N-bit shifted from the first test-data stream as each of the second data stream and the fourth data stream, where N denotes a natural number. The timing adjuster has a setting mode for adjusting the timing setting so as to maximize the detected value from the light intensity detector. The controller in the adjustment mode controls the first phase adjuster and the second phase adjuster in such a manner that the first phase-difference setting and the second phase-difference setting are zero, at least temporarily places the data generator in the first test mode, and at least temporarily places the timing adjuster in the setting mode.

In a method for controlling an optical modulation unit in the present invention, the optical modulation unit includes a data generator, a timing adjuster, at least one branch, a first optical modulator, a second optical modulator, a first phase adjuster, a first optical synthesizer, a third optical modulator, a fourth optical modulator, a second optical synthesizer, a polarized-wave synthesizer, and a peak detection circuit. The data generator generates a first data-stream group having first and second data streams, and a second data-stream group having third and fourth data streams. The timing adjuster shifts a timing between the first data-stream group and the second data-stream group in accordance with a timing setting. The at least one branch divides a received light beam into a first light beam, a second light beam, a third light beam, and a fourth light beam. The first optical modulator modulates the first light beam on the basis of the first data stream. The second optical modulator modulates the second light beam on the basis of the second data stream. The first phase adjuster shifts the phase difference between a light beam from the first optical modulator and a light beam from the second optical modulator in accordance with a first phase-difference setting. The first optical synthesizer synthesizes the light beam from the first optical modulator, and the light beam from the second optical modulator through the first phase adjuster. The third optical modulator modulates the third light beam on the basis of the third data stream. The fourth optical modulator modulates the fourth light beam on the basis of the fourth data stream. The second phase adjuster shifts the phase difference between a light beam from the third optical modulator and a light beam from the fourth optical modulator in accordance with a second phase-difference setting. The second optical synthesizer synthesizes the light beam from the third optical modulator, and the light beam from the fourth optical modulator through the second phase adjuster. The polarized-wave synthesizer synthesizes a light beam from the first optical synthesizer and a light beam from the second optical synthesizer that are two polarized waves orthogonal to each other. The peak detection circuit outputs a detected value by detecting the intensity peak of a light beam coming from the polarized-wave synthesizer. The method for controlling the optical modulation unit includes the following steps. The first phase-difference setting in the first phase adjuster and the second phase-difference setting in the second phase adjuster are rendered zero. A first test-data stream repeating 2N-bit marks and 2N-bit spaces is generated from the data generator as each of the first data stream and the third data stream, where N denotes a natural number. A second test-data stream that is N-bit shifted from the first test-data stream is generated from the data generator as each of the second data stream and the fourth data stream, where N denotes a natural number. The timing setting in the timing adjuster is adjusted so as to maximize the detected value from the peak detection circuit while the first and second test-data streams are generated.

The ordinal numbers in the foregoing description, such as the "first" to "fourth", are used to distinguish components with the same name from one another, and thus do not limit the total number of the components.

Effects of the Invention

The optical modulation unit according to the one aspect of the present invention uses a repeated pattern of 2N-bit marks and 2N-bit spaces as the first test-data stream and the second test-data stream when adjusting the timing difference between the polarized waves. The first test-data stream and the second test-data stream are N-bit shifted from each other; thus, synthesizing two light beams obtained using these streams produces a pulse pattern having a 2N-bit cycle. The polarized waves orthogonal to each other individually have this pulse pattern. The intensity peak of a synthesized light beam consisting of these polarized waves hence decreases as the amount of timing difference between the polarized waves increases up to N bits. Therefore, maximizing the intensity peak addresses a timing difference of up to nearly N bits. Further, selecting the value of N enables adjustment suitable for an arbitrary amount of timing difference.

The optical modulation unit according to the other aspect of the present invention synthesizes the two polarized waves, which are to be synthesized as two polarized waves orthogonal to each other to produce a modulated signal output, are synthesized as two polarized waves having a common polarized-wave direction to adjust the timing difference between the polarized waves. A repetition pattern of 2N-bit marks and 2N-bit spaces are used as the first test-data stream and the second test-data stream. The first test-data stream and the second test-data stream are N-bit shifted from each other; thus, synthesizing two light beams obtained using these streams produces a pulse pattern having a 2N-bit cycle. The two polarized waves each have this pulse pattern. The intensity peak of a synthesized light beam consisting of these polarized waves hence decreases as the amount of timing difference between the polarized waves increases up to N bits. Therefore, maximizing the intensity peak addresses a timing difference of up to nearly N bits. Further, selecting the value of N enables adjustment suitable for an arbitrary amount of timing difference. This intensity is the intensity of a synthesized light beam consisting of the two polarized waves having a common polarized-wave direction. The two polarized waves having a common polarized-wave direction interfere with each other; hence, the amount of timing difference between the polarized waves is sensitively reflected to the light intensity. This eliminates the need for a signal of a light intensity to undergo complex processing in timing adjustment. Such elimination simplifies the configuration of the optical modulation unit.

The method for controlling an optical modulation unit in the present invention uses a repeated pattern of 2N-bit marks and 2N-bit spaces as the first test-data stream and the second test-data stream when adjusting the timing difference between the polarized waves. The first test-data stream and the second test-data stream are N-bit shifted from each other; thus, synthesizing two light beams obtained using these streams produces a pulse pattern having a 2N-bit cycle. The polarized waves orthogonal to each other individually have this pulse pattern. The intensity peak of a synthesized light beam consisting of these polarized waves hence decreases as the amount of timing difference between the polarized waves increases up to N bits. Therefore, maximizing the intensity peak addresses a timing difference of up to nearly N bits. Further, selecting the value of N enables adjustment suitable for an arbitrary amount of timing difference.

These and other objects, features, aspects and advantages of the present invention will become more apparent from the following detailed description of the present invention when taken in conjunction with the accompanying drawings.

BRIEF DESCRIPTION OF DRAWINGS

FIG. 9 is a schematic view of the configuration of an optical modulation unit according to a second embodiment of the present invention.

DESCRIPTION OF EMBODIMENT(S)

Embodiments will be described with reference to the drawings.

First Embodiment

Figure 1:
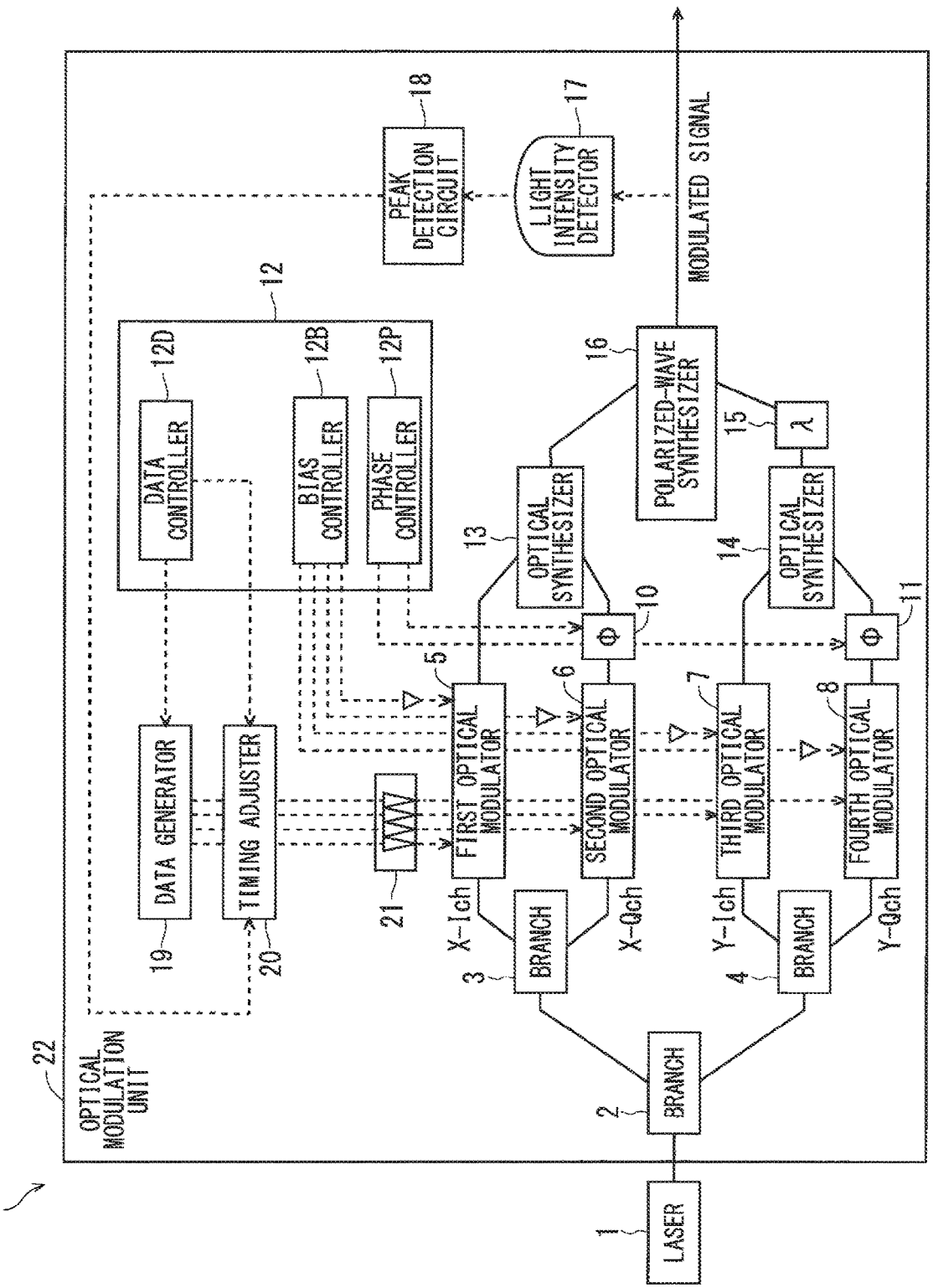
FIG. 1 is a schematic view of the configuration of an optical transmitter including an optical modulation unit according to a first embodiment of the present invention.

FIG. 1 is a schematic view of the configuration of an optical transmitter 91 including an optical modulation unit 22 according to a first embodiment of the present invention. The optical transmitter 91 includes the optical modulation unit 22, and a laser light source 1 that outputs a laser light beam to the optical modulation unit 22. The optical modulation unit 22 is a DP-QPSK modulation unit. That is, modulation provides four phases for each of two polarized waves: an X-polarized wave, which is also referred to as a horizontal polarized wave (H-polarized wave); and a Y-polarized wave, which is also referred to as a vertical polarized wave (V-polarized wave). In other words, an optical signal in a real-part in-phase channel (Ich) and an optical signal in an imaginary-part quadrature-phase channel (Qch) are synthesized at a carrier phase difference of $\pi/2$ in each of the two polarized waves, thus generating a complex-light electric field.

The optical modulation unit 22 includes a data generator 19, a timing adjuster 20, an electric-signal amplifier 21, branches 2 to 4, first to fourth optical modulators 5 to 8, a first phase adjuster 10, a second phase adjuster 11, a controller 12, a first optical synthesizer 13, a second optical synthesizer 14, a polarized-wave rotator 15, a polarized-wave synthesizer 16, a light intensity detector 17, and a peak detection circuit 18.

Each of the first to fourth optical modulators 5 to 8 is a MZ optical modulator. The MZ optical modulator modulates light using a refractive index change, i.e., an "electro-optic effect", resulting from field application. The MZ optical modulator typically contains indium phosphide. Although FIG. 1 does not show the detailed configuration of each MZ optical modulator, the MZ optical modulator includes two optical waveguides provided with electrodes, and two Y-branch optical waveguides connected in parallel to the optical waveguides. This MZ optical modulator serves as a "Mach-Zehnder interferometer. The MZ optical modulation, when modulating light, changes the intensity of a light beam passing through the Mach-Zehnder interferometer in accordance with a phase difference between the two optical waveguides that results from a refractive-index change controlled by voltage application to the electrodes. The electrodes receive a modulated signal voltage and a bias voltage. The MZ optical modulator has both high signal quality such as a low chirp, and high speed.

A set of the first optical modulator 5 and the second optical modulator 6 constitutes a dual-parallel Mach-Zehnder modulator (DP-MZM), also called an I/Q modulator, that includes, as a MZ interferometer, MZ optical modulators connected in parallel. This modulator synthesizes an optical signal in the real-part Ich and an optical signal in the imaginary-part Qch while providing a carrier phase difference of $\pi/2$, thus generating a complex-light electric field. A set of the third optical modulator 7 and the fourth optical modulator 8 is configured in the same manner. Further, an X-polarized wave from the set of the first optical modulator 5 and the second optical modulator 6, and a Y-polarized wave with a 90° rotation, from the set of the third optical modulator 7 and the fourth optical modulator 8, are synthesized to be thus multiplexed. This polarize-wave multiplexing obtains a DP-QPSK modulation output.

The data generator 19 generates a plurality of data streams for multi-level modulation. In this embodiment, the data generator 19 generates a first data-stream group having first and second data streams, and a second data-stream group having third and fourth data streams. Each data stream of the first data-stream group is used to modulate the X-polarized wave. Each data stream of the second data-stream group is used to modulate the Y-polarized wave. The first and third data streams are used to modulate the real-part Ich. The second and fourth data streams are used to modulate the imaginary-part Qch. That is, the first, second, third, and fourth data streams are respectively used to modulate optical signals X-Ich, X-Qch, Y-Ich, and Y-Qch.

The timing adjuster 20 shifts timing between the first data-stream group for the X-polarized wave and the second data-stream group for the Y-polarized wave in accordance with a timing setting. An appropriate timing setting offsets an unfavorable timing difference resulting from, for instance, the distance from the data generator 19 to each modulator. A timing setting is hereinafter represented also by "(X, Y)". In addition, different timing settings (X, Y) are hereinafter distinguished from one another by subscripts, as necessary. A timing setting is used for relative timing adjustment between the first data-stream group and the second data-stream group. Hence, there are two kinds of adjustment direction according to which of the first or second data-stream group has a relatively later timing than the other. The two kinds of adjustment direction are also referred to as a "plus direction" and a "minus direction".

It is noted that the timing adjuster 20 may further adjust timing between the first and second data streams of the first data-stream group, and adjust timing between the third and fourth data streams of the second data-stream group.

The electric-signal amplifier 21 receives electric signals of the first to fourth data streams from the data generator 19 via the timing adjuster 20. The electric-signal amplifier 21 amplifies the individual four electric signals and outputs the signals to the first to fourth optical modulators 5 to 8. It is noted that the data generator 19, the timing adjuster 20, and the electric-signal amplifier 21, in part or in whole, may be integrated to constitute, for instance, an IC or an LSI.

The branches 2 to 4 each divide the laser light beam received from the laser light source 1, into first to fourth light beams. To be specific, the laser light beam is firstly branched into two light beams by the branch 2. The branched two light beams are further individually branched into two light beams by the branches 3 and 4. The first to fourth light beams are respectively transmitted to the first to fourth optical modulators 5 to 8.

The first to fourth optical modulators 5 to 8 individually receive the first to fourth data streams as electrical signals. The first to fourth optical modulators 5 to 8 individually modulate the first to fourth light beams in response to these signal inputs.

The first phase adjuster 10 shifts the phase difference between a light beam from the first optical modulator 5 and a light beam from the second optical modulator 6 in accordance with a first phase-difference setting. The second phase adjuster 11 shifts the phase difference between a light beam from the third optical modulator 7 and a light beam from the fourth optical modulator 8. Such shifting controls the amount of phase shift between the real-part Ich and the imaginary-part Qch in each polarized wave. The first and second phase-difference settings are each $\pi/2$ in normal mode for normal QPSK modulation. Such settings provide a carrier phase difference of $\pi/2$ when the optical signal in the real-part Ich and the optical signal in the imaginary-part Qch are synthesized. The first and second phase-difference settings are each zero when the controller 12 is in adjustment mode, the details of which will be described later on.

The first optical synthesizer 13 synthesizes the light beam from the first optical modulator 5, and the light beam from the second optical modulator 6 through the first phase adjuster 10. The second optical synthesizer 14 synthesizes the light beam from the third optical modulator 7, and the light beam from the fourth optical modulator 8 through the second phase adjuster 11.

The polarized-wave rotator 15 rotates a polarized wave by 90°. The polarized-wave synthesizer 16 synthesizes a light beam from the first optical synthesizer 13 and a light beam from the second optical synthesizer 14. These light beams are two polarized waves orthogonal to each other.

The light intensity detector 17 detects the intensity of a light beam that is output from the polarized-wave synthesizer 16. The light intensity detector 17 is a photodiode (PD) for instance. The peak detection circuit 18 outputs a detected value by detecting the peak of the light intensity as detected by the light intensity detector 17. The peak detection circuit 18 may be included in an IC.

The controller 12 includes a data controller 12D, a bias controller 12B, and a phase controller 12P. The controller 12 has, as well as a normal mode, an adjustment mode for adjusting the timing setting in the timing adjuster 20. The phase controller 12P controls the first phase-difference setting in the first phase adjuster 10 and the second phase-difference setting in the second phase adjuster 11. To be specific, the phase controller 12P controls the first phase adjuster 10 and the second phase adjuster 11 in such a manner that the first and second phase-difference settings are $\pi/2$ in the normal mode and are zero in the adjustment mode. The data controller 12D in the adjacent mode at least temporarily places the data generator 19 in first test mode, which will be detailed later on, and preferably, in second test mode thereafter, which will be detailed later on. The data controller 12D in the adjustment mode also places the timing adjuster 20 in setting mode. The timing adjuster 20 in the setting mode adjusts the timing setting in the timing adjuster 20 so as to maximize the detected value from the peak detection circuit 18. The bias controller 12B controls the bias voltage across the first to fourth optical modulators 5 to 8.

As earlier described, the data generator 19 has the first test mode. The data generator 19 in the first test mode generates a first test-data stream repeating 2N-bit marks and 2N-bit spaces as each of the first data stream and the third data stream, where N denotes a natural number. The data generator 19 in the first test mode also generates a second test-data stream that is N-bit shifted from the first test-data stream as each of the second data stream and the fourth data stream, where N denotes a natural number. The details will be described later on.

N is preferably equal to or more than two in the data generator 19 when the data generator 19 is in the first test mode. The data generator 19 more preferably has the second test mode. In this case, the data controller 12D in the adjustment mode places the data generator 19 in the first test mode and then in the second test mode. The data generator 19 in the second test mode generates a third test-data stream repeating 2-bit marks and 2-bit spaces as each of the first data stream and the third data stream. The data generator 19 also generates a fourth test-data stream that repeats 2-bit marks and 2-bit spaces and is 1-bit shifted from the third test-data stream, the third test data being each of the second data stream and the fourth data stream.

Optical paths, such as optical waveguides, spaces, and fibers, are optically connected between the laser light source 1 and the branch 2, between the branch 2 and the branch 3 or the branch 4, between the branch 3 and the first optical modulator 5 or the second optical modulator, between the branch 4 and the third optical modulator 7 or the fourth optical modulator 8, between the second optical modulator and the first phase adjuster 10, between the fourth optical modulator and the second phase adjuster 11, between the first optical modulator or the first phase adjuster 10 and the first optical synthesizer 13, between the third optical modulator or the second phase adjuster 11 and the second optical synthesizer 14, between the second optical synthesizer 14 and the polarized-wave rotator 15, between the first optical synthesizer 13 or the polarized-wave rotator 15 and the polarized-wave synthesizer 16, and between the polarized-wave synthesizer 16 and the light intensity detector 17. Further, electrical paths are electrically connected between the bias controller 12B and the first to fourth optical modulators 5 to 8, between the phase controller 12P and the first phase adjuster 10 or the second phase adjuster 11, between the light intensity detector 17 and the peak detection circuit 18, between the peak detection circuit 18 and the timing adjuster 20, between the data generator 19 and the timing adjuster 20, and between the timing adjuster 20 and the electric-signal amplifier 21.

It is noted that the optical modulation unit may have any configuration including a plurality of optical modulators, other than the configuration illustrated in FIG. 1. To be specific, the optical modulation unit may be a DP-QPSK modulation unit other than the configuration illustrated in FIG. 1. Alternatively, the modulation unit may be any kind of modulation unit, such as a DP-16QAM, other than the DP-QPSK modulation unit. It is also noted that the data generator, the timing adjuster, and the electric-signal amplifier each may have any configuration in which electrical signals are input to a plurality of optical modulators, other than the configuration illustrated in FIG. 1.

The following describes the operation of the optical transmitter 91.

The laser light beam from the laser light source 1 is input to the optical modulation unit 22. The laser light beam is branched into the first to fourth light beams by the branches 2 to 4. The first to fourth light beams are respectively input to the first to fourth optical modulators 5 to 8. The signal voltages of the first to fourth data streams, which are generated by the data generator 19, undergo timing adjustment in the timing adjuster 20, and are amplified by the electric-signal amplifier 21, are applied across the first to fourth optical modulators 5 to 8 along with the bias voltage, which is controlled by the bias controller 12B. The light beams are accordingly modulated. The optical output from the second optical modulator 6 and the optical output from the fourth optical modulator 8 are respectively input to the first phase adjuster 10 and the second phase adjuster 11. Accordingly, the optical output from the second optical modulator 6 and the optical output from the fourth optical modulator 8 are respectively phase-shifted from the optical output from the first optical modulator 5 and the optical output from the third optical modulator 7. How much the individual optical outputs from the second and fourth optical modulators 6 and 8 are phase-shifted is determined by the first and second phase-difference settings, both of which are controlled in the phase controller 12P. The optical output from the first optical modulator 5 (i.e., the optical signal X-Ich) and the optical output from the first phase adjuster 10 (i.e., the optical signal X-Qch) are synthesized by the first optical synthesizer 13. The optical output from the third optical modulator 7 (i.e., the optical signal Y-Ich) and the optical output from the second phase adjuster 11 (i.e., the optical signal Y-Qch) are synthesized by the second optical synthesizer 14. The optical output from the second optical synthesizer 14 is rotated by 90° by the polarized-wave rotator 15. The optical output from the first optical synthesizer 13 and the optical output from the polarized-wave synthesizer 16 undergo polarized-wave synthesis in the polarized-wave rotator 15. An output after the polarized-wave synthesis is sent as a DP-QPSK modulated signal. The light intensity detector 17 detects the light intensity of this modulated signal output using part of the modulated signal output. The detected light intensity undergoes peak detection in the peak detection circuit 18. A value detected by the peak detection circuit is used to adjust electric-signal timing between the first data-stream group for the X-polarized wave and the second data-stream group for the Y-polarized wave. The following describes the details.

Figure 2:
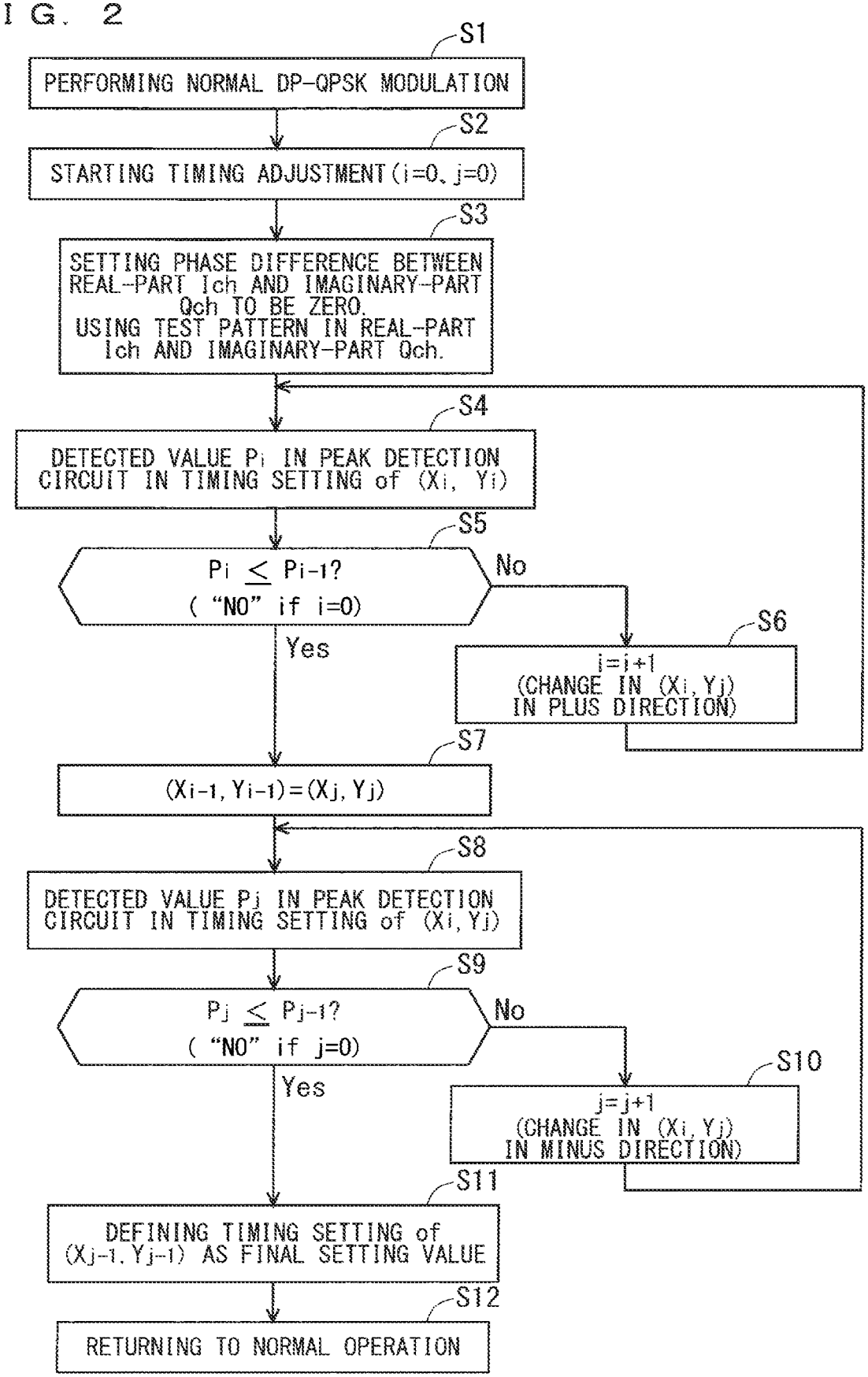
FIG. 2 is a flowchart schematically showing a method for controlling the optical modulation unit in FIG. 1.

FIG. 2 is a flowchart schematically showing a method for controlling the optical modulation unit 22 to perform the aforementioned timing adjustment.

A normal DP-QPSK modulated signal is output in step S1. To be specific, the data generator 19 outputs random data patterns as the first to fourth data streams. That is, marks (logic "1") and spaces (logic "0") are each generated on a random basis with a 50% probability. The generation can be performed by a pseudo-random-bit-sequence (PRBS) generation function in the data generator 19. This function may be replaced with a data stream for practical communication. The timing setting in the timing adjuster 20, i.e., the timing setting between the X-polarized wave and the Y-polarized wave, is an arbitrary initial value $(X_0, Y_0)$. The first to fourth data streams, after processed in the timing adjuster 20, are each amplified by the electric-signal amplifier 21 and then input to the first to fourth optical modulators 5 to 8.

The bias controller 12B always controls the bias voltage in such a manner that the optical output from the first optical synthesizer 13 is minimum (a null point) when no electric signal from the electric-signal amplifier 21 is input to the first and second optical modulators 5 and 6. Likewise, the bias controller 12B always controls the bias voltage in such a manner that the optical output from the second optical synthesizer 14 is minimum (a null point) when no electric signal from the electric-signal amplifier 21 is input to the third and fourth optical modulators 7 and 8. The phase controller 12P controls the first phase adjuster 10 and the second phase adjuster 11 in such a manner that the first phase-difference setting and the second phase-difference setting are $\pi/2$. In other words, the phase controller 12P finds and uses a control value such that the first phase-difference setting and the second phase-difference setting are $\pi/2$.

Next, the timing adjuster 20 starts timing adjustment in step S2. That is, the controller 12 goes into the adjustment mode. Counters i and j are each zero at this stage.

In step S3, the data controller 12D of the controller 12 in the adjustment mode places the data generator 19 in the first test mode. The data streams, generated from the data generator 19, accordingly change from the random data patterns in step S1 to test-data patterns. To be specific, the data generator 19 in the first test mode generates the first test-data stream repeating 2N-bit marks and 2-N bit spaces as each the first and third data streams for the real-part Ich. Here, N denotes a natural number. The data generator 19 also generates the second test-data stream that is N-bit shifted from the first test-data stream as each of the second and fourth data streams for the imaginary-part Qch. That is, the first test-data stream is generated in common for the optical signals X-Ich and Y-Ich; moreover, the second test-data stream is generated in common for the optical signals X-Qch and Y-Qch.

Figure 3:
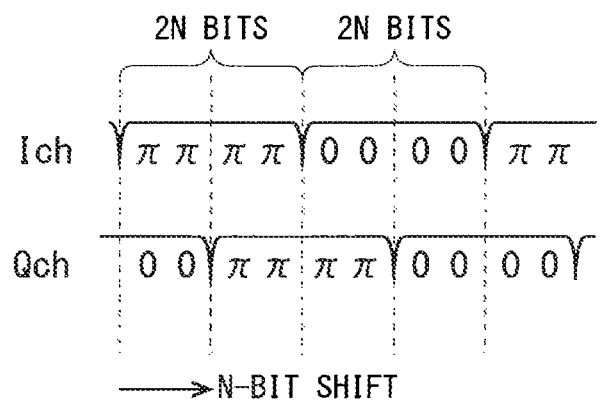
FIG. 3 is a graph showing first and second test-data streams generated by a data generator, in the method for controlling the optical modulation unit in FIG. 2 when N=2 is satisfied.

For N=2, a first test-data stream, "1111000011110000 . . . " is generated; at the same time, a second test-data stream, "0011110000111100 . . . " is generated. Provided that phase modulation in phase 0 and phase modulation in phase π respectively correspond to logic "0" and logic "1" in this case, the real-part Ich and the imaginary-part Qch have phases illustrated in FIG. 3 in common between the X-polarized wave and the Y-polarized wave.

Figure 4:
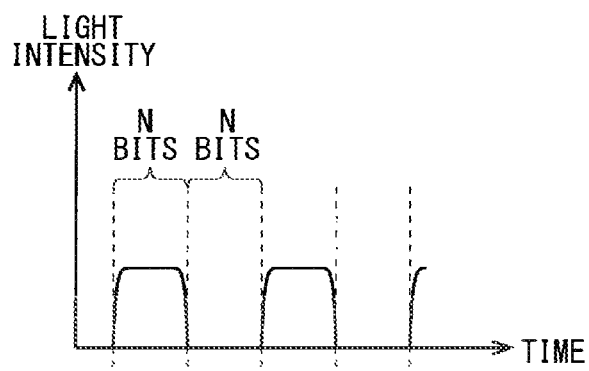
FIG. 4 is a graph showing the intensity of a light beam synthesized by an optical synthesizer in the method for controlling the optical modulation unit in FIG. 2.

The phase controller 12P of the controller 12 in the adjustment mode controls the first phase adjuster 10 and the second phase adjuster 11 in such a manner that the first and second phase-difference settings are zero. Accordingly, the intensity of the modulated light beam from each of the first and second optical synthesizers 13 and 14 has a repetition pattern of continuous N-bit marks (logic "1") and continuous N-bit spaces (logic "0"), as illustrated in FIG. 4.

The data controller 12D of the controller 12 in the adjustment mode also places the timing adjuster 20 in the setting mode. The timing adjuster 20 accordingly adjusts the timing setting so as to maximize the detected value from the peak detection circuit 18 while the first and second test-data streams are generated as described above. To be specific, the following steps S4 to S11 are performed.

Figure 5:
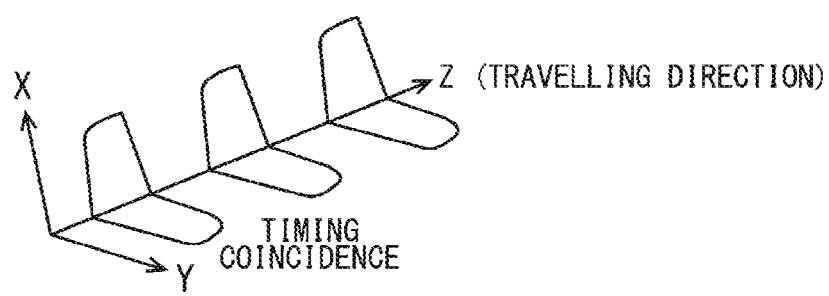
FIG. 5 is a graph showing a light beam synthesized by a polarized-wave synthesizer in the method for controlling the optical modulation unit in FIG. 2 when the timing of an X-polarized wave coincides with the timing of a Y-polarized wave.
Figure 6:
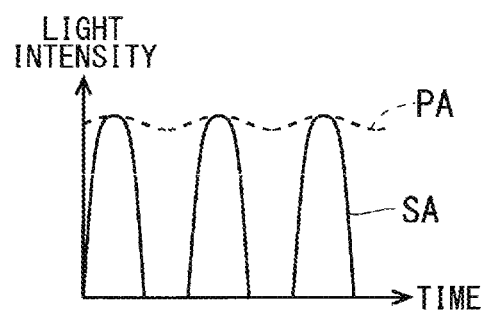
FIG. 6 is a graph showing detected values in peak detection with respect to light intensity in FIG. 5.
Figure 7:
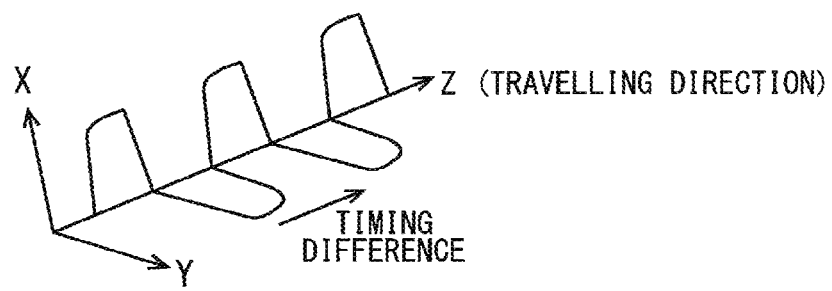
FIG. 7 is a graph showing a light beam synthesized by the polarized-wave synthesizer when the timing of the X-polarized wave and the Y-polarized wave is N-bit shifted, in the method for controlling the optical modulation unit in FIG. 2.
Figure 8:
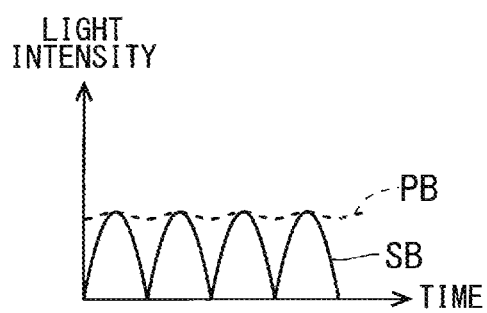
FIG. 8 is a graph showing detected values in peak detection with respect to light intensity in FIG. 7.

In step S4, detected is a detected value $P_i$ in the peak detection circuit in a timing setting of $(X_i, Y_i)$ in the timing adjuster 20. Here, polarized-wave synthesis illustrated in FIG. 5 is performed provided that the timing setting between the X-polarized wave and the Y-polarized wave is optimal. In this case, a detected value PA obtained by detecting the peak of a light intensity SA, is maximized as illustrated in FIG. 6. The detection value gets smaller as the difference in the timing setting between the X-polarized wave and the Y-polarized wave gets greater. A detected value PB is minimized as illustrated in FIG. 8 once a timing difference reaches N bits as illustrated in FIG. 7. A further large difference starts the detected value increasing again.

A timing difference between polarized waves inherently does not change a detected value of a light intensity. Furthermore, when a high data rate causes a rapid change between marks and spaces, a common light intensity detector that does not have a high band detects only an average light intensity, and thus has low detection accuracy. The present embodiment greatly reflects the timing difference in optical output between the X-polarized wave and the Y-polarized wave to changes in the detected value in the peak detection circuit 18.

Whether $P_i \leq P_{i-1}$ is satisfied is determined in step S5. In case of i=0, a determination of "NO" is made. The processing proceeds to step S6 in a determination of "NO".

In step S6, count-up of i=i+1 (increment) is made to change the timing setting $(X_i, Y_i)$ to the plus direction. The processing then returns to step S4, thus repeating the aforementioned process steps. This repetition goes on until the processing moves to step S7 when $P_i \leq P_{i-1}$ is satisfied in step S5.

In step S7, setting of $(X_{i-1}, Y_{i-1})=(X_j, Y_j)$ is made. This completes an attempt to maximize the detected value $P_i$ through the adjustment of the timing setting in the plus direction. In a similar way, in steps S8 to S11, an attempt to maximize the detected value $P_i$ through timing setting adjustment in the minus direction is completed. As a result, both plus-direction adjustment and minus-direction adjustment are tried. A timing setting $(X_{j-1}, Y_{j-1})$ in step S11 maximizes the detected value $P_i$ regardless of whether the initial value $(X_0, Y_0)$ of the timing setting deviates in the plus direction or the minus direction. This timing setting is defined as the final setting value in the timing adjuster 20.

In step S12, the controller 12 changes from the adjustment mode into the normal mode. That is, processing for timing adjustment is completed, and a setting for normal DP-QPSK modulation, described in step S1, is used again. To be specific, an output from the data generator 19 is defined as a normal data stream; in addition, the first phase-difference setting in the first phase adjuster 10 and the second phase-difference setting in the second phase adjuster 11 are returned to π/2. This enables normal DP-QPSK modulation under an optimal timing setting from then on.

The aforementioned timing setting addresses a timing difference of up to nearly N bits. To be exact, a timing difference of just N bits fails to determine in which of the plus and minus directions the timing adjustment should be made. An addressable maximum amount of timing difference is hence less than N bits.

As described above, a greater value of N addresses a greater timing difference. Nevertheless, an excessively great value of N, which reduces the ratio of change in the detected value $P_i$ to the amount of timing adjustment, hinders accurate adjustment. The value of N in the first test mode hence can be set in accordance with a conceivable maximum amount of timing difference between the X-polarized wave and the Y-polarized wave. It is preferable that N≥2 be satisfied in the first test mode, and that the steps S2 through S12 be performed again in the second test mode, in which N=1 is satisfied, using the value obtained in step S11 as an initial value. In this case, a timing difference equal to or more than N≥2 is approximately eliminated through adjustment in the first test mode, followed by making a highly accurate adjustment through adjustment in the second test mode.

(Gist of Effect)

The present embodiment uses the repetition pattern of 2N-bit marks and 2N-bit spaces as the first and second test-data streams when adjusting the timing difference between the polarized waves. The first and second test-data streams are N-bit shifted from each other; thus, synthesizing two light beams obtained using these streams produces a pulse pattern having a 2N-bit cycle. This pulse pattern is included in each of the X-polarized wave and the Y-polarized wave orthogonal to each other. The intensity peak of a synthesized light beam consisting of these polarized waves hence decreases as the amount of timing difference between the polarized waves increases up to N bits. Therefore, maximizing the intensity peak addresses a timing difference of up to nearly N bits. Further, selecting the value of N enables adjustment suitable for an arbitrary amount of timing difference.

N is preferably equal to or more than two when the data generator 19 is in the first test mode. This addresses a timing difference equal to or more than one bit. The second test mode in which N=1 is satisfied is more preferably used in addition to the first test mode in which N≥2 is satisfied. This reduces a timing difference with further high accuracy while addressing the timing difference equal to or more than one bit.

Second Embodiment

FIG. 9 is a schematic view of the configuration of an optical modulation unit 22M according to a second embodiment of the present invention. The optical modulation unit 22M, like the optical modulation unit 22 (FIG. 1: the first embodiment), modulates a received laser light beam to output a modulated signal. The optical modulation unit 22M thus can be used instead of the optical modulation unit 22, in the optical transmitter 91 (FIG. 1).

The optical modulation unit 22M includes a first 2×2 optical synthesizer 23 (first optical synthesizer) instead of the first optical synthesizer 13 (FIG. 1: the first embodiment), and a second 2×2 optical synthesizer 24 (second optical synthesizer) instead of the second optical synthesizer 14 (FIG. 1: the first embodiment). Each "2×2 optical synthesizer" synthesizes light beams from two input terminals to generate a synthesized light beam, and then outputs the synthesized light beam from each of two output terminals. The 2×2 optical synthesizer may include a photocoupler that uses, for instance, a multi-mode interferer (MMI) or a fiber.

To be specific, the first 2×2 optical synthesizer 23 includes an input terminal 23a, an input terminal 23b, an output terminal 23e, and an output terminal 23f. The input terminal 23a receives a light beam from the first optical modulator 5. The input terminal 23b receives a light beam from the second optical modulator 6 via the first phase adjuster 10. These light beams are synthesized to generate a synthesized light beam. The synthesized light beam is output from each of the output terminal 23e and the output terminal 23f. The second 2×2 optical synthesizer 24 includes an input terminal 24a, an input terminal 24b, an output terminal 24e, and an output terminal 24f. The input terminal 24a receives a light beam from the third optical modulator 7. The input terminal 24b receives a light beam from the fourth optical modulator 8 via the second phase adjuster 11. These light beams are synthesized to generate a synthesized light beam. The synthesized light beam is output from each of the output terminal 24e and the output terminal 24f.

The polarized-wave synthesizer 16 synthesizes the light beam from the output terminal 23e of the first 2×2 optical synthesizer 23 and the light beam from the output terminal 24e of the second 2×2 optical synthesizer 24. These light beams are two polarized waves orthogonal to each other. The configuration illustrated in FIG. 9 includes the polarized-wave rotator 15 between the output terminal 24e and the polarized-wave synthesizer 16 in order to render these two polarized waves orthogonal to each other.

The optical modulation unit 22M includes an optical synthesizer 25 (third optical synthesizer). The optical synthesizer 25 synthesizes the light beam from the output terminal 23f of the first 2×2 optical synthesizer 23 and the light beam from the output terminal 24f of the second 2×2 optical synthesizer 24. These light beams are two polarized waves having a common polarized-wave direction.

The light intensity detector 17 in the present embodiment, unlike the same in the first embodiment, outputs a detected value by detecting the intensity of a light beam coming from the optical synthesizer 25. Further, the timing adjuster 20 uses the detected value in the light intensity detector 17 instead of the detected value in the peak detection circuit 18 (FIG. 1: the first embodiment). The timing adjuster 20 in the setting mode thus adjusts a timing setting so as to maximize the detected value from the light intensity detector 17. Therefore, the present embodiment omits the peak detection circuit 18 (FIG. 1: the first embodiment).

Timing adjustment in the present embodiment, in conformance with the above configuration, uses the detected value in the light intensity detector 17 instead of the detected value in the peak detection circuit when operating in a manner similar to the operation illustrated by the flowchart in FIG. 2 (the first embodiment). Except this regard, the operation in the present embodiment is the same as that in the first embodiment.

It is noted that the components in FIG. 9 except the polarized-wave rotator 15 and the polarized-wave synthesizer 16, may be included in an optical modulation element 26. In this case, the optical modulation element 26 outputs two polarized waves having a common polarized-wave direction. The two polarized waves are rendered orthogonal to each other by the polarized-wave rotator 15. The orthogonal polarized waves are synthesized by the polarized-wave synthesizer 16, thus generating a modulated signal.

The other configuration is almost the same as that in the first embodiment; thus, like elements are denoted by the same sings, and will not be elaborated upon here. The present embodiment, like the first embodiment, enables timing adjustment in conformance with a timing difference of up to nearly N bits, and also enables adjustment suitable for an arbitrary amount of timing difference by selecting the value of N.

According to the present embodiment, to generate a modulated-signal output, a polarized wave from the output terminal 23e, and a polarized wave from the output terminal 24e through the polarized-wave rotator 15 are synthesized. These two polarized waves, are orthogonal to each other. In the adjustment of a timing difference between these polarized waves, the optical synthesizer 25 synthesizes a polarized wave from the output terminal 23f and a polarized wave from the output terminal 24f. These two polarized waves have a common polarized-wave direction. In addition, the light intensity detector 17 detects the intensity of the light beam coming from the optical synthesizer 25. This intensity is thus the intensity of a synthesized light beam consisting of the two polarized waves having a common polarized-wave direction. The two polarized waves having a common polarized-wave direction interfere with each other; hence, the amount of timing difference between the polarized waves is sensitively reflected to the light intensity. This eliminates the need for a signal of a light intensity to undergo complex processing in timing adjustment. To be specific, a peak detection circuit, as used in the first embodiment, is not necessarily required. Such elimination simplifies, the configuration of the optical modulation unit.

It is noted that in the present invention, the individual embodiments can be freely combined, or can be modified and omitted as appropriate, within the scope of the invention. While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1, 1P laser light source, 2 to 4 branch, 5 to 8 first to fourth optical modulators, 10, 11 first and second phase adjusters, 12 controller, 12B bias controller, 12D data controller, 12P, phase controller, 13, 14 first and second optical synthesizers, 15 polarized-wave rotator, 16 polarized-wave synthesizer, 17 light intensity detector, 18 peak detection circuit, 19 data generator, 20 timing adjuster, 21 electric-signal amplifier, 22 optical modulation unit, 22M optical modulation unit, 23 first 2×2 optical synthesizer (first optical synthesizer), 24 second 2×2 optical synthesizer (second optical synthesizer), 25 optical synthesizer (third optical synthesizer), 91 optical transmitter

The invention claimed is:

1. An optical modulation unit comprising:
a data generator configured to generate a first data-stream group comprising first and second data streams, and a second data-stream group comprising third and fourth data streams;
a timing adjuster configured to shift a timing between the first data-stream group and the second data-stream group in accordance with a timing setting;
at least one branch configured to divide a received light beam into a first light beam, a second light beam, a third light beam, and a fourth light beam;
a first optical modulator configured to modulate the first light beam on the basis of the first data stream;
a second optical modulator configured to modulate the second light beam on the basis of the second data stream;
a first phase adjuster configured to shift a phase difference between a light beam from the first optical modulator and a light beam from the second optical modulator in accordance with a first phase-difference setting;
a first optical synthesizer configured to synthesize the light beam from the first optical modulator and the light beam from the second optical modulator, after the light beam from the second optical modulator passes through the first phase adjuster;
a third optical modulator configured to modulate the third light beam on the basis of the third data stream;
a fourth optical modulator configured to modulate the fourth light beam on the basis of the fourth data stream;
a second phase adjuster configured to shift a phase difference between a light beam from the third optical modulator and a light beam from the fourth optical modulator in accordance with a second phase-difference setting;
a second optical synthesizer configured to synthesize the light beam from the third optical modulator and the light beam from the fourth optical modulator, after the light beam from the fourth optical modulator passes through the second phase adjuster;
a polarized-wave synthesizer configured to synthesize a light beam from the first optical synthesizer and a light beam from the second optical synthesizer that are two polarized waves orthogonal to each other;
a peak detection circuit configured to output a detected value by detecting an intensity peak of a light beam coming from the polarized-wave synthesizer; and
a controller having an adjustment mode for adjusting the timing setting in the timing adjuster,
wherein the data generator has a first test mode,
the data generator in the first test mode is configured to generate a first test-data stream repeating 2N-bit marks and 2N-bit spaces as each of the first data stream and the third data stream, and is configured to generate a second test-data stream that is N-bit shifted from the first test-data stream as each of the second data stream and the fourth data stream, where N denotes a natural number,
the timing adjuster has a setting mode for adjusting the timing setting so as to maximize the detected value from the peak detection circuit, and
the controller in the adjustment mode is configured to control the first phase adjuster and the second phase adjuster in such a manner that the first phase-difference setting and the second phase-difference setting are zero, and is configured to at least temporarily place the data generator in the first test mode and to at least temporarily place the timing adjuster in the setting mode.

2. The optical modulation unit according to claim 1, wherein N is equal to or more than two when the data generator is in the first test mode.

3. The optical modulation unit according to claim 2, wherein
the data generator has a second test mode,
the data generator in the second test mode is configured to generate a third test-data stream repeating 2-bit marks and 2-bit spaces as each of the first data stream and the third data stream, and is configured to generate a fourth test-data stream repeating 2-bit marks and 2-bit spaces and being 1-bit shifted from the third test-data stream as each of the second data stream and the fourth data stream, and
the controller in the adjustment mode is configured to place the data generator in the first test mode and then in the second test mode.

4. An optical modulation unit comprising:
a data generator configured to generate a first data-stream group comprising first and second data streams, and a second data-stream group comprising third and fourth data streams;
a timing adjuster configured to shift a timing between the first data-stream group and the second data-stream group in accordance with a timing setting;
at least one branch configured to divide a received light beam into a first light beam, a second light beam, a third light beam, and a fourth light beam;
a first optical modulator configured to modulate the first light beam on the basis of the first data stream;
a second optical modulator configured to modulate the second light beam on the basis of the second data stream;
a first phase adjuster configured to shift a phase difference between a light beam from the first optical modulator and a light beam from the second optical modulator in accordance with a first phase-difference setting;
a first optical synthesizer configured to synthesize the light beam from the first optical modulator and the light beam from the second optical modulator, after the light beam from the second optical modulator passes through the first phase adjuster;
a third optical modulator configured to modulate the third light beam on the basis of the third data stream;
a fourth optical modulator configured to modulate the fourth light beam on the basis of the fourth data stream;
a second phase adjuster configured to shift a phase difference between a light beam from the third optical modulator and a light beam from the fourth optical modulator in accordance with a second phase-difference setting;
a second optical synthesizer configured to synthesize the light beam from the third optical modulator and the light beam from the fourth optical modulator, after the light beam from the fourth optical modulator passes through the second phase adjuster;

a polarized-wave synthesizer configured to synthesize a first light beam from the first optical synthesizer and a first light beam from the second optical synthesizer that are two polarized waves orthogonal to each other;

a third optical synthesizer configured to synthesize a second light beam from the first optical synthesizer and a second light beam from the second optical synthesizer that are two polarized waves having a common polarized-wave direction;

a light intensity detector configured to output a detected value by detecting an intensity of a light beam from the third optical synthesizer; and a controller having an adjustment mode for adjusting the timing setting in the timing adjuster, wherein the data generator has a first test mode, the data generator in the first test mode is configured to generate a first test-data stream repeating 2N-bit marks and 2N-bit spaces as each of the first data stream and the third data stream, and is configured to generate a second test-data stream that is N-bit shifted from the first test-data stream as each of the second data stream and the fourth data stream, where N denotes a natural number, the timing adjuster has a setting mode for adjusting the timing setting so as to maximize the detected value from the light intensity detector, and the controller in the adjustment mode is configured to control the first phase adjuster and the second phase adjuster in such a manner that the first phase-difference setting and the second phase-difference setting are zero, and is configured to at least temporarily place the data generator in the first test mode and to at least temporarily place the timing adjuster in the setting mode.

5. A method for controlling an optical modulation unit, the optical modulation unit comprising a data generator configured to generate a first data-stream group comprising first and second data streams, and a second data-stream group comprising third and fourth data streams, a timing adjuster configured to shift a timing between the first data-stream group and the second data-stream group in accordance with a timing setting, at least one branch configured to divide a received light beam into a first light beam, a second light beam, a third light beam, and a fourth light beam, a first optical modulator configured to modulate the first light beam on the basis of the first data stream, a second optical modulator configured to modulate the second light beam on the basis of the second data stream, a first phase adjuster configured to shift a phase difference between a light beam from the first optical modulator and a light beam from the second optical modulator in accordance with a first phase-difference setting, a first optical synthesizer configured to synthesize the light beam from the first optical modulator and the light beam from the second optical modulator, after the light beam from the second optical modulator passes through the first phase adjuster, a third optical modulator configured to modulate the third light beam on the basis of the third data stream, a fourth optical modulator configured to modulate the fourth light beam on the basis of the fourth data stream, a second phase adjuster configured to shift a phase difference between a light beam from the third optical modulator and a light beam from the fourth optical modulator in accordance with a second phase-difference setting, a second optical synthesizer configured to synthesize the light beam from the third optical modulator and the light beam from the fourth optical modulator, after the light beam from the fourth optical modulator passes through the second phase adjuster, a polarized-wave synthesizer configured to synthesize a light beam from the first optical synthesizer and a light beam from the second optical synthesizer that are two polarized waves orthogonal to each other, and a peak detection circuit configured to output a detected value by detecting an intensity peak of a light beam coming from the polarized-wave synthesizer, the method comprising steps of:

rendering the first phase-difference setting in the first phase adjuster and the second phase-difference setting in the second phase adjuster zero;

generating, from the data generator, a first test-data stream repeating 2N-bit marks and 2N-bit spaces as each of the first data stream and the third data stream, and generating, from the data generator, a second test-data stream that is N-bit shifted from the first test-data stream as each of the second data stream and the fourth data stream, where N denotes a natural number; and adjusting the timing setting in the timing adjuster, when the first test-data stream and the second test-data stream are generated, so as to maximize the detected value from the peak detection circuit.

6. The optical modulation unit according to claim 4, comprising a polarized wave rotator configured to rotate the first light beam from the second optical synthesizer to be orthogonal with respect to the first light beam from the first optical synthesizer.

* * * * *